(12) United States Patent
Pierce et al.

(10) Patent No.: US 6,412,789 B1
(45) Date of Patent: Jul. 2, 2002

(54) SEMI-TRAILER SUSPENSION AIR SPRING CONTROL SYSTEM

(75) Inventors: Phillippi R. Pierce, Canton; Jesse W. Cervantez, Navarre, both of OH (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 10/039,347

(22) Filed: Jan. 4, 2002

(51) Int. Cl.$^7$ .............................................. B60G 17/005
(52) U.S. Cl. ................................ 280/6.151; 267/64.16; 267/64.28
(58) Field of Search .............................. 267/64.16, 126, 267/123; 303/70, 71; 280/6.151, 124.116, 124.157, 124.16, 124.161

(56) References Cited

U.S. PATENT DOCUMENTS

| | | | | |
|---|---|---|---|---|
| 5,333,645 A | * | 8/1994 | Galazin | ................ 137/627.5 |
| 5,921,532 A | * | 7/1999 | Pierce et al. | ............. 267/64.16 |
| 6,152,486 A | * | 11/2000 | Pierce | ........................ 280/255 |
| 6,257,597 B1 | * | 7/2001 | Galazin | ................... 280/6.151 |

* cited by examiner

*Primary Examiner*—Christopher P. Schwartz
(74) *Attorney, Agent, or Firm*—Buckingham, Doolittle & Burroughs, LLP; David P. Dureska, Esq.

(57) ABSTRACT

An automatic pneumatic control system for the air springs of a semi-trailer air-ride trailing beam-type axle/suspension system. A plurality of conduits and valves of the control system pneumatically interconnect one or more sources of compressed air, the vehicle parking brakes and the suspension air springs. The control system incorporates a vented two-position two-way pilot valve for controlling inflation and deflation of each air spring. The valve closes when air pressures in a pair of control system sensor lines differ, thereby enabling complete or nearly complete deflation of the air spring it controls before the parking brake is set, thereby minimizing or eliminating the problems of trailer drop and walk during loading of an empty trailer, heretofore caused by complete or nearly complete deflation of the air springs only after the parking brakes are already set.

7 Claims, 4 Drawing Sheets

SEMI-TRAILER SUSPENSION AIR SPRING CONTROL SYSTEM

BACKGROUND OF THE INVENTION

1. Field of the Invention

The invention relates to semi-trailer air-ride axle/suspension systems, and in particular to the automatic pneumatic control system for the air springs of its suspension assemblies. More particularly, the invention is directed to an automatic pneumatic control system for suspension air springs which includes a pilot valve that is sensitive to differing air pressures in certain parts of the system, resulting in rapid, generally instantaneous exhaustion of a sufficient amount of air from the springs when the vehicle is docked and before the parking brakes are set or engaged, thereby minimizing or eliminating the problems of sudden trailer drop and trailer walk or movement away from the dock during loading of the trailer.

2. Background Art

Many commercial semi-trailers utilize air-ride axle/suspension systems to provide a smooth ride for cargo carried by the vehicle, as well as to ensure a comfortable ride for the operator and any passengers riding in the semi-trailer cab or tractor. A key component of an air-ride axle/suspension system is its air springs. However, such air springs, while providing a softer ride during operation of the vehicle, are not conducive to stability during loading of the trailer. More specifically, before loading of the trailer is to commence at a dock, the suspension air springs typically are exhausted of a sufficient amount of pressurized air to enable the frame of the trailer to be lowered until it contacts physical stops or bumpers conventionally located within the air springs. This lowering of the frame against the bumpers makes the trailer more stable for a loading operation. A pilot valve, typically referred to in the industry as an automatic or gladhand dump valve, is connected to the pressurized air supply of the semi-trailer and each air spring, and controls inflation and deflation of its respective air spring.

However, conventional automatic suspension air spring control systems currently in use in the semi-trailer industry, while achieving their intended result, fail to achieve optimum stability of the semi-trailer during loading operations. More particularly, the pilot valves of these prior art control systems operate only in response to the pressure status of the air conduits that are directly connected to the vehicle parking brake. Such control systems necessarily are tied-in to the status of the parking brake for obvious safety reasons. Specifically, it would be undesirable for the air springs to exhaust when the parking brake is disengaged and the semi-trailer is operating over-the-road. Thus, when the parking brakes are released or disengaged for over-the-road travel, the parking brake air conduits are sufficiently pressurized to overcome the spring bias that engages the brake, thereby maintaining the brake in a released condition. A pressure sensor line transmits this higher air pressure to the pilot valve, and the pressure in the sensor line also is sufficiently high to overcome the pilot valve spring bias to the closed position and shift it to the open position to cause inflation of the air spring through the opened valve to a selected over-the-road operation ride height. Because such pilot valves typically activate or open automatically when the parking brakes are released, no driver interaction or training is required. Conversely, when the parking brakes are engaged, such as when the semi-trailer is docked for loading, the valve automatically closes, air pressure is exhausted from the air springs, and the vehicle frame lowers into contact with the air spring bumpers. This contact of the frame with the bumpers creates a more stable condition for trailer loading.

However, the above-described prior art control system may not always be completely effective for its intended purpose when the docked trailer is empty and the axle/suspension system has a trailing beam design. Specifically, a trailing beam pivots at its bushing mounting to the vehicle frame hanger. This pivotal attachment structure at the front end of the beam is what allows the trailer frame, to lower when air is exhausted from the air spring located at the opposite or rear end of the beam. However, the air spring control systems commonly in use today do not begin exhausting air pressure from the springs until the parking brakes already are begining to engage or are engaged and such engagement typically occurs very quickly, taking only about 1.5 seconds. Thus, in order for the trailer frame to lower once the parking brakes are set, which is before a sufficient amount of air contained in the air springs is exhausted, the tires must rotate together with the pivoting suspension beam or the engaged parking brakes must drag against their engagement force. However, an empty trailer fails to generate enough force to overcome the brake engagement forces or the friction forces between the tires and the ground. Thus, in such a situation, the trailer frame is maintained at ride-height, even though the trailer is docked and air has been exhausted from the air springs. Despite being strong enough to maintain the trailer frame at its operational height after exhaustion of air from the air springs of an empty trailer, such tire-ground friction forces and parking brake engagement forces nonetheless are relatively weak. Therefore, when a towmotor or forklift is driven onto the trailer deck from the dock to begin loading the trailer, such tire friction or brake engagement forces typically are overcome by the weight of the towmotor and its driver. As a result, the trailer frame drops suddenly against the bumpers of the previously deflated air springs. In addition, the arcuate movement of the trailing beam and possible resulting forward rotation of the tires also can cause the trailer to move or "walk" away from the dock. Such a sudden drop and forward movement of the Trailer deck, while unnerving to the towmotor operator, also can cause damage to the trailer landing gear and disengagement of the loading ramp dock plate. These conditions are undesirable. The present invention reduces or eliminates the incidence of trailer drop and walk by exhausting a sufficient amount of air from the air springs, and bringing the trailer frame in contact or nearly in contact with the air spring bumpers before engagement of the parking brake.

SUMMARY OF THE INVENTION

Objectives of the present invention include providing an automatic pneumatic control system for suspension air springs capable of exhausting a sufficient amount of air from the springs generally instantaneously and before engagement of the parking brakes, thereby enabling the trailer frame to lower against the air spring bumpers.

Another objective of the present invention is to provide such a pneumatic control system which is economical, durable and reliable in use, and easy to install, maintain, and use.

These objectives and advantages are obtained by the pneumatic control system for the air springs of a vehicle axle/suspension system of the present invention, wherein the control system includes a plurality of conduits and valves extending between and pneumatically interconnecting at least one source of pressurized air, at least one vehicle parking brake and the air springs, and pilot valve means for controlling the inflation and deflation of the air springs, the valve means closing in response to differing air pressures in the control system resulting from initiation of engagement of the parking brake, so that a sufficient amount of pressurized air is exhausted from the air springs through the valve means to substantially deflate the air springs before the parking brake is engaged.

BRIEF DESCRIPTION OF THE DRAWINGS

The preferred embodiment of the invention, illustrative of the best mode in which the applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

So that the environment in which the suspension air spring automatic pneumatic control system of the present invention operates can be best understood, a typical trailing arm air-ride axle/suspension system will be briefly described immediately below.

Figure 1:
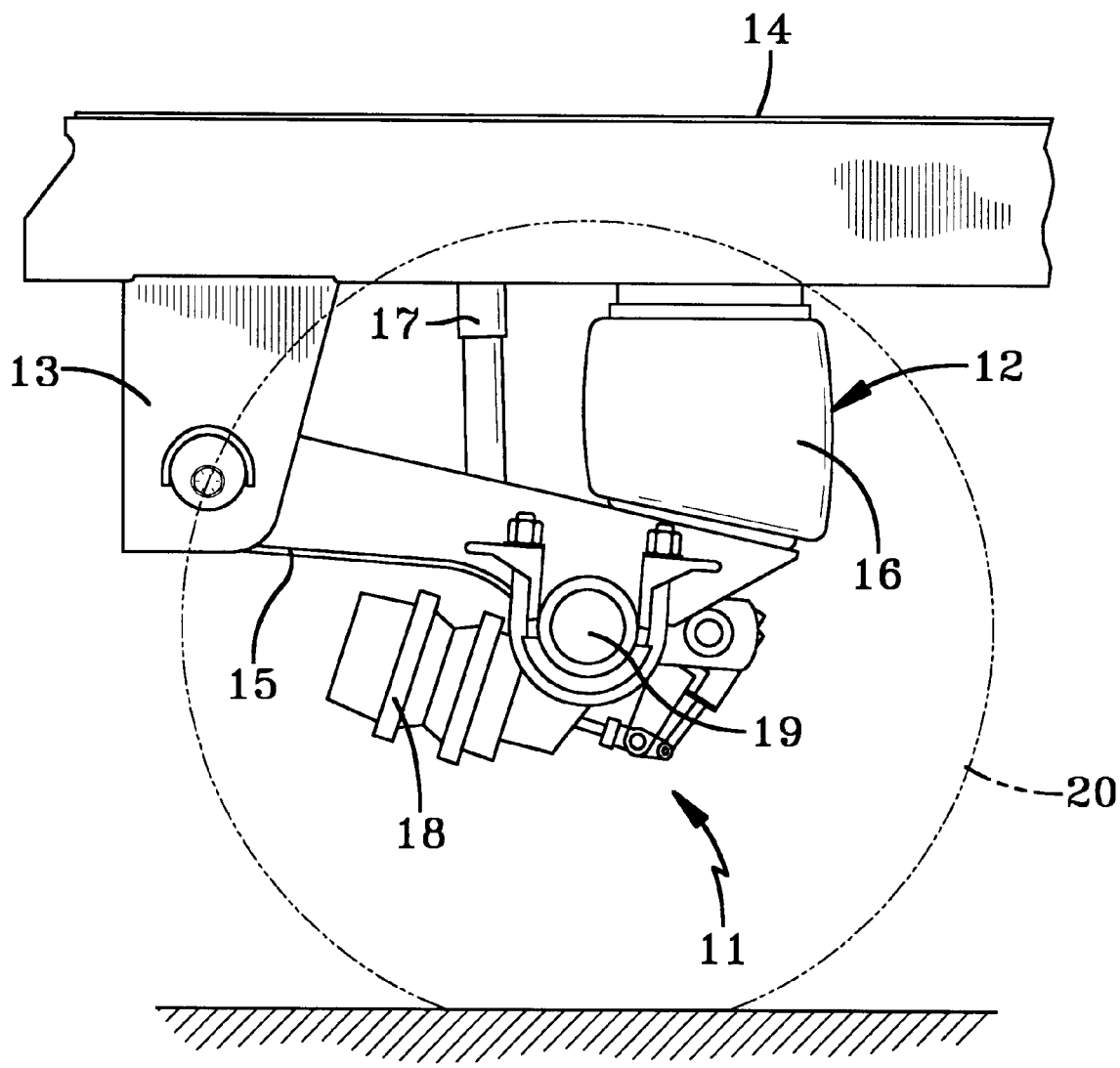
FIG. 1 is a fragmentary side view of a prior art air-ride trailing beam-type axle/suspension system suspended from a semi-trailer frame, with the vehicle wheel represented by phantom lines, and showing the suspension air spring in an inflated condition for over-the-road operation of the vehicle.
Figure 2:
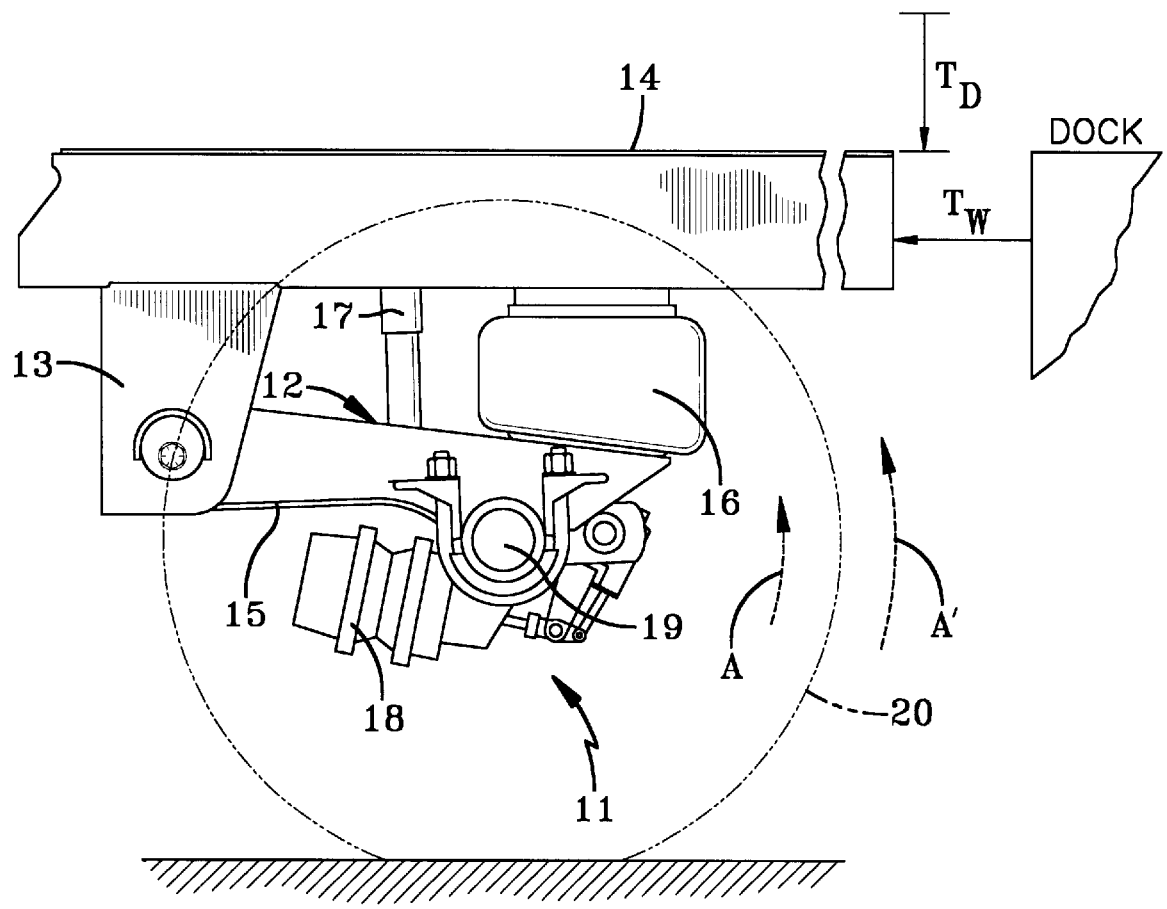
FIG. 2 is a view similar to FIG. 1, but showing the frame in its lowermost position against the air spring bumper after air has been exhausted from the air spring subsequent to engagement of the parking brake, and illustrating the resulting phenomena of trailer drop and trailer walk that can occur when the suspension incorporates a prior art air spring control system.

An axle/suspension system is indicated generally at 11 and is shown in FIGS. 1 and 2, with FIG. 1 representing the axle/suspension system in an over-the-road operational state and FIG. 2 illustrating the axle/suspension system in a parked or docked state. Axle/suspension system 11 includes a pair of generally identical suspension assemblies 12 each suspended from a respective one of a pair of transversely spaced frame hangers 13. Hanger 13 is secured to and depends from a frame 14 of the semi-trailer. Inasmuch as suspension assemblies 12 are identical, only one will be described hereinbelow and shown in the drawings. Suspension assembly 12 includes a trailing arm-type suspension beam which is pivotally mounted at its front end on hanger 13 in a usual manner through the use of a suitable bushing assembly (not shown). An air spring 16 of the type having an internal stop or bumper (not shown) is suitably mounted on and extends between the upper surface of the rear end of suspension beam 15 and frame 14. A shock absorber 17 also is mounted on and extends between beam 15 and frame 14. Another component of axle/suspension system 11 is a dual service/parking brake chamber 18. An axle 19 extends between and is captured in the pair of suspension beams 15, and one or more wheels 20 are mounted on each end of the axle.

Figure 3:
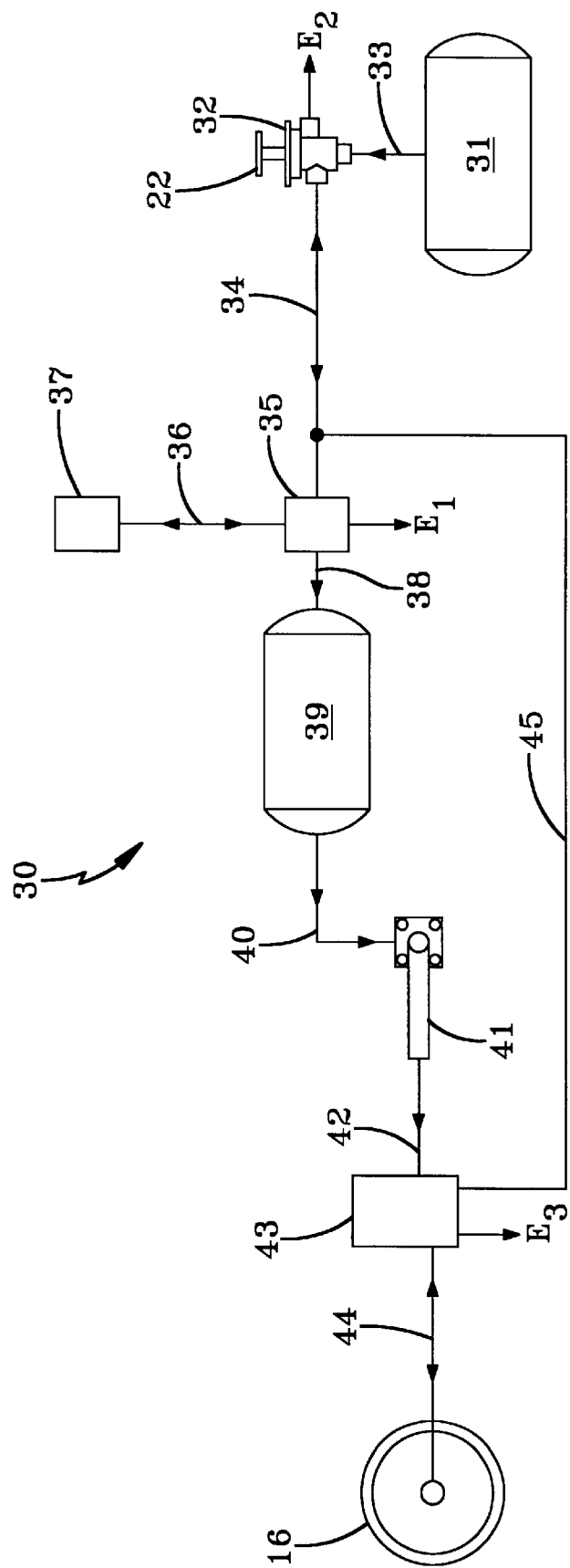
FIG. 3 is a diagrammatic view of a prior art automatic control system for semi-trailer suspension air springs.

A diagrammatic view of a prior art suspension air spring automatic pneumatic control system is indicated generally at 30 and is shown in FIG. 3. A reservoir of pressurized air for the tractor of the semi-trailer is indicated at 31, and as is well known to those skilled in the semi-trailer art, the supply of air in the tractor air reservoir, and in any other air reservoirs described hereinbelow and used on the semi-trailer, is generated by a usual compressor (not shown). A compressor is necessary since during the course of operation of the vehicle, air is exhausted from pneumatic control system 30 and must be replenished. Tractor air reservoir 31 is pneumatically connected via a conduit 33 to a parking brake actuation valve 32, having an exhaust port as indicated by arrow $E_2$, located in the cab of the tractor for easy access by the operator. It is understood that the directional arrows shown on each conduit such as conduit 33 indicate the possible direction or directions of airflow within the conduit during operation of pneumatic control system 30. Parking brake actuation valve 32 is actuated by a push/pull knob 22 which opens and closes, respectively, the valve, as will be described hereinbelow in greater detail in the explanation of the operation of pneumatic control system 30. Valve 32 typically is a vented two-position twoway valve and is part of a control module specifically designed to operate the parking brakes of both the trailer and the tractor in conformance with federal regulations. An example of a suitable control module which incorporates valve 32 is the MV-2 Control Module made available by the Heavy Vehicle Systems Group of Bendix. A trailer supply line 34 pneumatically connects parking brake actuation valve 32 to a parking brake relay valve 35, which has an exhaust port as indicated by arrow $E_1$. A conduit 36 pneumatically connects parking brake relay valve 35 to the chamber (not shown) of a parking brake 37. Parking brake relay valve 35 also is pneumatically connected to trailer air reservoir 39 by a conduit 38. A conduit 40 in turn pneumatically connects trailer air reservoir 39 to a conventional height control valve 41 used to set the operational ride-height of the semi-trailer, or the height that vehicle frame 14 is maintained from the travel surface by axle/suspension system 11. Height control valve 41 is pneumatically connected via a conduit 42 to an air spring pilot valve 43 having an exhaust port as represented by arrow $E_3$. It is understood that pilot valve 43 is a two-position three-way valve which is spring-biased to the closed position. Pilot valve 43 is pneumatically connected to air spring 16 via a conduit 44. A pressure sensor line 45 extends between and is pneumatically connected to supply line conduit 34 and pilot valve 43 to complete the components and arrangement of pneumatic control system 30. It is understood that sensor line 45 is free of air flow, but rather the varying pressures of air contained in the line operate pilot valve 43, as will be described in detail hereinbelow.

The operation of prior art suspension air spring automatic control system 30 now will be described. If it is desired to operate the semi-trailer over-the-road, as represented in FIG. 1, air springs 16 of axle/suspension system 11 must be in a fully inflated state, and parking brake 37 must be released or disengaged. Upon disengagement of parking brake 37, air pressure is supplied to the other components of control system 30 by tractor reservoir 31, and passes all the way through the system to air spring 16. More particularly, parking brake 37 is disengaged by the operator of the semi-trailer by pushing in knob 22 of parking brake actuation valve 32. Valve 32 opens enabling pressurized air to travel from tractor reservoir 31, through conduit 33, through open valve 32, through conduit 34, through parking brake relay valve 35, and through conduit 36 and into the chamber of parking brake 37. Parking brake 37 is spring biased to the set or engaged position, but the pressurized air passing through conduit 36 as described is sufficient to overcome the spring bias and release the parking brake and maintain it in a disengaged condition. Pressure sensor line 45 in turn also is pressurized by an amount corresponding to the level of air pressure in conduit 34, and the air pressure overcomes the spring bias of pilot valve 43 to the closed position. Pilot valve 43 thus opens enabling pressurized air to travel from conduit 38 through trailer air reservoir 39, conduit 40, height control valve 41, conduit 42, open pilot valve 43, conduit 44, and into air spring 16, to inflate the air spring and raise semi-trailer frame 14 to a suitable ride-height condition as predetermined by the height control valve.

When it is desired by the operator of the vehicle to park or dock the semi-trailer for loading or unloading, the vehicle is positioned adjacent to the dock and parking brake 37 is set or engaged. More specifically, parking brake 37 is engaged by the semi-trailer driver by pulling knob 22 of parking brake actuation valve 32. Valve 32 closes causing the pressurized air to automatically exhaust from conduit 34 and out of exhaust port $E_2$ of valve 32. This in turn causes brake relay valve 35 to close and exhaust the chamber of parking brake 37 through conduit 36 and to atmosphere through exhaust port $E_1$ of valve 35. Such a drop in pressurized air in the chamber of parking brake 37 enables the bias of its spring to engage the brake. Pressure sensor line 45 in turn senses the loss of air pressure in conduit 34 and thus itself correspondingly loses pressure, which in turn also enables the bias of the spring of pilot valve 43 to close that valve and block the flow of air into air spring 16. Upon the closing of pilot valve 43, pressurized air is automatically exhausted from air spring 16, through conduit 44, into pilot valve 43, and out of its exhaust port $E_3$.

Although automatic control system 30 satisfactorily exhausts air from air springs 16, it is the timing of that exhaustion that creates certain disadvantages in the use of the prior art pneumatic control system. More particularly, the standard air pressure in conduit 34 is from about 90 to about 130 pounds per square inch (psi). However, it is important to understand that air spring 16 does not start exhausting air until the pressure in conduit 34 drops all the way to about 10 to about 35 psi, at which time the spring in pilot valve 43 has enough force to overcome the pressurized air in sensor line 45 and close the valve. However, parking brake 37, which typically engages in about 1.5 seconds, is set before air spring 16 exhausts a significant amount of air, due to the time it takes pressure sensor line 45 to drop to the threshold pressure of about 10 to about 35 psi enabling valve 43 to close. Thus, if the trailer is in an unloaded condition, the frictional forces of engaged parking brake 37 and tires 20 against the ground are sufficient to prevent semi-trailer frame 14 from lowering against the bumper of air spring 16 despite the fact that the air spring has been exhausted of a significant amount of its pressurized air.

Once a load is applied to trailer frame 14, such as a towmotor and operator driving onto the trailer deck from a dock to load it with goods, such weight typically is enough to overcome either of the described frictional forces and the frame drops suddenly. In addition, because of the pivotal nature of attachment of beam 15 through its bushing assembly to frame 14 via hanger 13, the beam travels in an arcuate fashion when such weight is added to the trailer, as shown by phantom arrow A in FIG. 2, and wheel 20 in turn can follow a similar arcuate path as represented by phantom arrow A'. Such movement of beam 15 and wheel 20 results in frame 14 and the semi-trailer "walking" away from the dock by as much as two to three inches as shown by arrow $T_w$. The drop distance of frame 14 also is usually two to three inches before it contacts the bumper stop of air spring 16, as represented by arrow $T_D$. As noted hereinabove, such sudden drop and walk of the trailer is undesirable.

Figure 4:
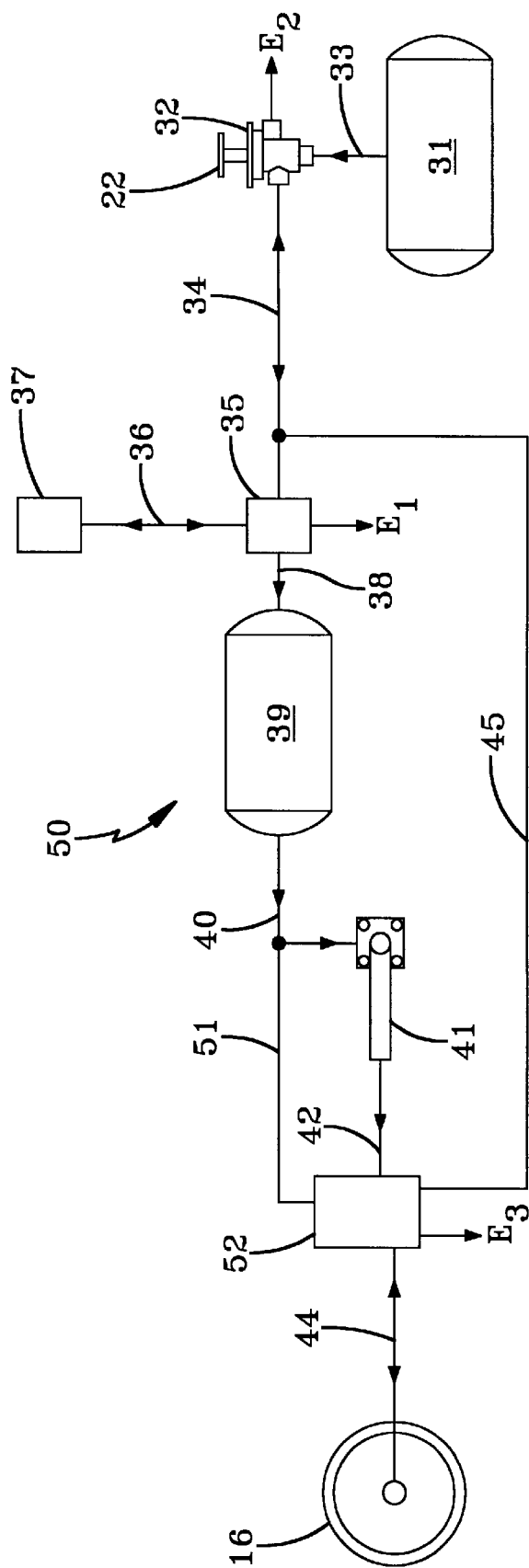
FIG. 4 is a view similar to FIG. 3, but showing the automatic control system of the present invention.

The present invention reduces or eliminates the above-described incidence of trailer drop and trailer walk in the following manner. As best shown in FIG. 4, the only differences between prior art suspension air spring automatic pneumatic control system 30 described hereinabove and the control system of the present invention indicated generally at 50 and shown in FIG.4, are as follows. A second or differential pressure sensor line 51 extends between and is pneumatically connected to air spring pilot valve 52 and conduit 40. Pilot valve 52 differs from prior art pilot valve 43 in that the bias of the spring in pilot valve 52 opens the valve, while the bias of the spring in pilot valve 43 closes that valve. Also, pilot valve 52 is a vented two-position two-way valve, commonly referred to as a double remote pilot valve, which accommodates differential pressure sensor line 51.

The operation of inventive suspension air spring automatic control system 50 now will be described. In preparation for over-the-road travel, parking brake 37 is disengaged by pushing in knob 22 of parking brake actuation valve 32. Valve 32 opens, thus enabling pressurized air to pass from tractor reservoir 31, through conduit 33, through open valve 32, through conduit 34, through parking brake relay valve 35, and through conduit 36 and into the chamber of parking brake 37 to overcome the spring bias of the parking brake and release and maintain it in a disengaged condition. Pressurized air also passes through conduit 38, trailer reservoir 39, conduit 40 which is pneumatically connected to pressure sensor line 51, height control valve 41 and conduit 42. Thus, both pressure sensor lines 45 and 51 are pressurized to about the same pressure due to the similar air pressure levels in conduits 34 and 40, respectively. Since the air pressures acting on pilot valve 52 via pressure sensor lines 45 and 51 are generally equal and opposed, the pressure forces balance out and the spring bias of pilot valve 52 is allowed to freely operate and open the valve. This action enables pressurized air to pass through open valve 52, through conduit 44 and into air spring 16 to inflate the air spring and raise trailer frame 14 to an operational ride-height controlled by height control valve 41, as shown in FIG. 1.

When it is desired to park the semi-trailer, such as when backing up to a dock as shown in FIG. 2, after the vehicle is stopped the parking brake is engaged by the driver pulling out knob 22 of parking brake actuation valve 32. Pressurized air in conduit 34 then exhausts at port $E_2$ through parking brake actuation valve 32. Valve 35 in turn closes which causes the pressurized air to automatically exhaust from the chamber of parking brake 37, through conduit 36, and into parking brake relay valve 35 where air is exhausted at port $E_1$. This drop in pressurized air in the chamber of parking brake 37 enables its biased spring to set or engage the brake. Also, the lowered air pressure in conduit 34 causes a corresponding air pressure drop in pressure sensor line 45.

However, and in accordance with one of the key features of the present invention, pressure sensor line 51 also acting on pilot valve 52 remains at the higher air pressure maintained in conduit 38, trailer air reservoir 39, conduits 40 and 42, and height control valve 41. The corresponding higher pressure in pressure sensor line 51 overcomes the spring bias of pilot valve 52 to the open position, thereby causing the valve to close and further causing the generally instantaneous exhaustion or dumping of air from air spring 16, through conduit 44, and out of valve 52 at its exhaust port E₃. Thus, rather than delaying exhaustion of air from air spring 16 until the pressure in sensor line 45 drops significantly, such as by as much as about 100 psi or more as in prior art control system 30, by which time parking brake 37 is engaged, exhaustion of air from air spring 16 in present invention control system 50 occurs after a minimal pressure drop in conduit 34 and pressure sensor line 45. For example, control system 50 can be designed to enable exhaustion of air spring 16 after a drop in air pressure in sensor line 45 of from about only 0 to about 50 psi, with a drop of about 25 psi being preferred. Thus, valve 52 is closed when the pressure in line 45 drops sufficiently, or from about 0 to about 50 psi, to allow pressure in line 51 to overcome the spring bias of valve 52. Thus, the dump of air from air spring 16 occurs in less time than it takes parking brake 37 to engage. Therefore, parking brake 37 is not set until after a significant amount of air is dumped from air spring 16. As a result, the problems of trailer drop and trailer walk are minimized or eliminated because frame 14 of the vehicle will not be prevented from dropping by the friction forces of tires 20 against the ground or engaged parking brake 37. Consequently, when a towmotor is driven onto the trailer for loading, frame 14 already is stabilized and lowered or nearly lowered against the bumper of air spring 16.

It is understood that although the actual air pressure values set forth above are typical for many control systems, including prior art system 30 and system 50 of the present invention, the present invention can be used in other applications where control systems operate at different air pressure levels, with a similar result of eliminating the need for a relatively significant pressure drop in sensor line 45 before air spring 16 exhausts.

Thus, it can be seen that the improved suspension air spring automatic pneumatic control system 50 of the present invention overcomes the disadvantages of pneumatic control systems such as prior art control system 30, those disadvantages being manifested in sudden trailer drop and trailer walk when the vehicle is parked and being loaded as represented in FIG. 2.

It is understood that other structural features of automatic control system 50 of the present invention also contribute to the rapid dumping of air from air spring 16, such as larger diameter of the various conduits, valves, and ports in the system, minimizing turns or bends in those conduits, and plumbing air springs 16 in parallel, all of which contribute to increased pressurized air flow and result in faster dumping of the air from the air springs.

It is further understood that pilot valve 52 could be incorporated into height control valve 41 without affecting the overall concept of the present invention. Moreover, pilot valve 52 could be constructed without a spring creating the bias of the valve to the open position, such as by substituting pressure switches and a solenoid for the spring, or configuring the spool in the pilot valve to respond to the differing levels of pressurized air in pressure sensor lines 45 and 51.

Accordingly, the improved suspension air spring automatic pneumatic control system for semi-trailers is simplified, provides an effective, safe, inexpensive, and efficient system which achieves all the enumerated objectives, provides for eliminating difficulties encountered with prior semi-trailer suspension air spring control systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved suspension air spring control system for semi-trailers is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A pneumatic control system for the air springs of a vehicle axle/suspension system, said control system including:

a) a plurality of conduits and valves extending between and pneumatically interconnecting at least one source of pressurized air, at least one vehicle parking brake and said air springs; and b) pilot valve means for controlling the inflation and deflation of said air springs, said valve means closing in response to differing air pressures in said control system resulting from initiation of engagement of said parking brake, so that a sufficient amount of pressurized air is exhausted from the air springs through the valve means to substantially deflate said air springs before the parking brake is engaged.

2. The pneumatic control system of claim 1, in which said pilot valve means is a vented two-position two-way valve; in which the valve is pneumatically connected to a pair of air pressure sensor lines; and in which a selected one of said pair of air pressure sensor lines is connected to and senses the level of air pressure in a selected one of said conduits adjacent to said parking brake.

3. The pneumatic control system of claim 2, in which said valve is spring-biased to an open position.

4. The pneumatic control system of claim 1, in which said control system is automatic; in which said vehicle is a semi-trailer; and in which said axle/suspension system includes a pair of trailing arms.

5. A method for controlling the inflation and deflation of a plurality of air springs of a vehicle axle/suspension system, said method including the steps of:

a) initiating engagement of at least one parking brake of said vehicle;

b) closing at least one air spring pilot valve in response to said initiation of engagement, thereby causing differing air pressures in certain ones of a plurality of conduits and valves extending between and pneumatically interconnecting at least one source of compressed air, said parking brake and said air springs; and c) exhausting a sufficient amount of pressurized air from and substantially deflating said air springs before said parking brake is engaged, so that a frame of said vehicle is lowered a substantial distance toward its lowermost position.

6. The method for controlling the inflation and deflation of air springs of claim 5, in which said pilot valve is closed by a higher level of air pressure in a certain one of said plurality of conduits to overcome a spring bias of the valve to an open position.

7. The method for controlling the inflation and deflation of air springs of claim 5, in which said method is automatic.

* * * * *